United States Patent
Jones

(10) Patent No.: US 8,182,887 B2
(45) Date of Patent: May 22, 2012

(54) VACUUM INSULATING GLASS UNIT WITH VISCOUS EDGE SEAL

(76) Inventor: Robert S. Jones, Delafield, WI (US)

( * ) Notice: Subject to any disclaimer, the term of this patent is extended or adjusted under 35 U.S.C. 154(b) by 0 days.

(21) Appl. No.: 13/046,858

(22) Filed: Mar. 14, 2011

(65) Prior Publication Data

US 2011/0236609 A1   Sep. 29, 2011

Related U.S. Application Data

(60) Provisional application No. 61/318,315, filed on Mar. 27, 2010, provisional application No. 61/327,058, filed on Apr. 22, 2010.

(51) Int. Cl.
   E06B 3/00     (2006.01)
   E04C 2/54     (2006.01)
(52) U.S. Cl. .................. 428/34; 52/171.3; 52/786.13
(58) Field of Classification Search .............. 428/34, 428/68, 72; 52/171.3, 172, 786.1, 786.13; 277/345, 404, 407, 500, 582
   See application file for complete search history.

(56) References Cited

U.S. PATENT DOCUMENTS

| | | | | |
|---|---|---|---|---|
| 3,061,895 | A * | 11/1962 | Kleinhans | 277/642 |
| 4,151,696 | A * | 5/1979 | Knights et al. | 52/745.15 |
| 5,116,686 | A * | 5/1992 | Schoen | 428/467 |
| 6,291,036 | B1 | 9/2001 | Wang et al. | |
| 6,399,169 | B1 | 6/2002 | Wang et al. | |
| 6,444,281 | B1 | 9/2002 | Wang et al. | |
| 6,503,583 | B2 | 1/2003 | Nalepka et al. | |
| 6,649,695 | B1 * | 11/2003 | Rath et al. | 525/95 |
| 7,817,328 | B2 | 10/2010 | Millett et al. | |
| 2008/0221370 | A1 * | 9/2008 | Lange et al. | 568/835 |
| 2009/0120035 | A1 | 5/2009 | Trpkovski | |
| 2009/0151854 | A1 | 6/2009 | Cooper | |
| 2009/0155499 | A1 | 6/2009 | Cooper | |
| 2010/0034996 | A1 | 2/2010 | Mott et al. | |

OTHER PUBLICATIONS

Schmidt, Sealants for IG Units Performance Parameters and Requirements, Glass Processing Days, Sep. 13-15, 1997, pp. 247-251.
Products for the Glass Industry, http://www.wessingtongroup.com/index.php?show=igi, Printed on Oct. 16, 2011.
Primary Sealant, http://www.dgsgroup.co.uk/catalogues/primary/index.html, Printed on Oct. 16, 2011.
Tremco JS680, http://www.tremco-illbruck.co.uk/products/00965__index.html, Printed on Oct. 16, 2011.
Product Information—Insulating Glass Primary Sealant GD 115, Kömmerling Chemische Fabrik GMBH. (Publication date unknown to applicant.).
Insulating Glass Manual, Dow Corning, 2010.
Oppanol PIB by BASF. The Global All-Rounder, Jan. 2010. BASF's Oppanol Polyisobutylenes, 2003.
Customer Success Story, BASF. (Publication date unknown to applicant.).
International Search Report and Written Opinion received in PCT/US2011/028264, Nov. 28, 2011.

* cited by examiner

*Primary Examiner* — Donald J Loney
(74) *Attorney, Agent, or Firm* — Bell & Manning, LLC

(57) ABSTRACT

Vacuum insulating glass (VIG) units, edge seals for VIG units and methods for forming the edge seals are provided. The VIG units include an edge seal that includes a viscous material, which serves to restrict the rate at which gas permeates into a vacuum space defined between the glass sheets of the VIG unit. The edge seals are configured to allow the glass sheets to move laterally relative to one another when the glass sheets experience differential thermal strain and further configured such that viscous shear occurs within at least a portion of the viscous material when there is relative lateral movement between the glass sheets.

13 Claims, 7 Drawing Sheets

Section "A"

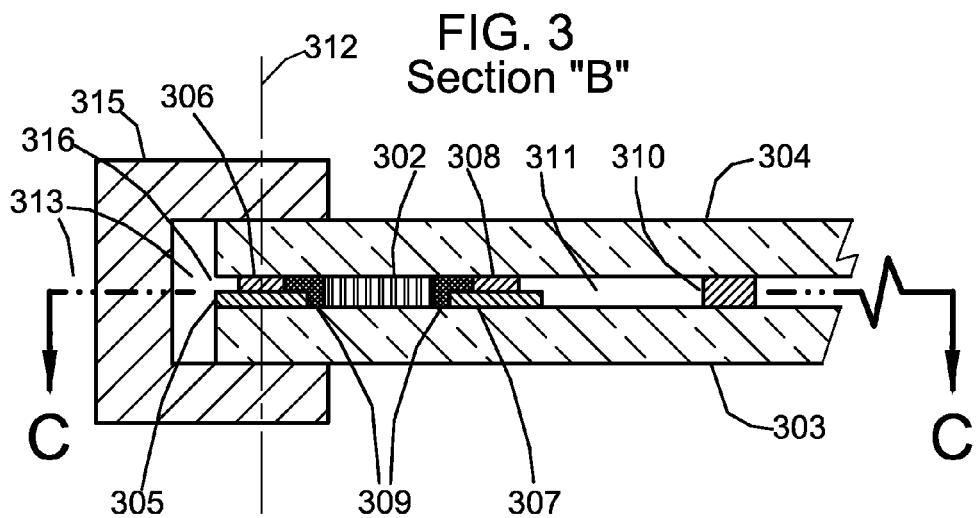
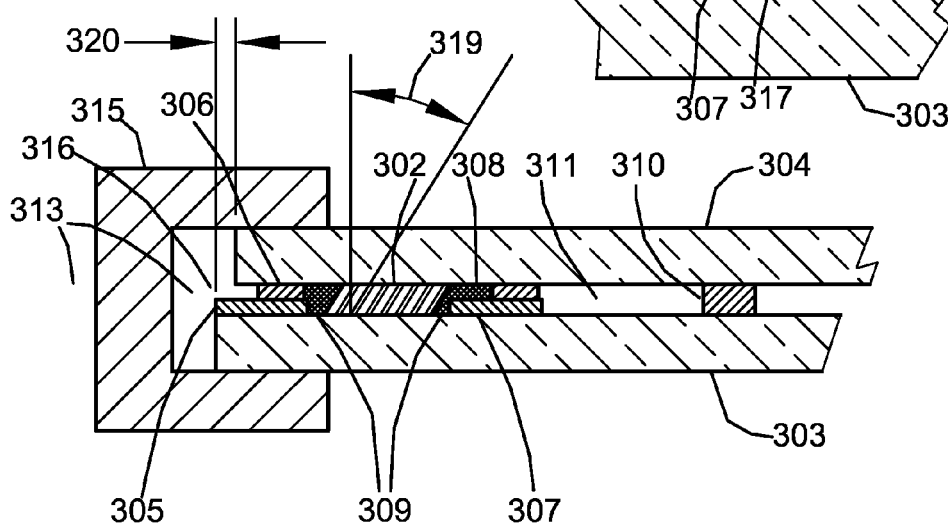

Section "C"

Section "B"

Section "B"

Section "B"

Section "B"

Section "D"

Section "E"

VACUUM INSULATING GLASS UNIT WITH VISCOUS EDGE SEAL

CROSS REFERENCE TO RELATED APPLICATIONS

The present application claims benefit of the following U.S. Provisional Applications: Ser. No. 61/318,315, filed on Mar. 27, 2010, and entitled "Viscous Edge Seal for Vacuum Insulating Panels;" and Ser. No. 61/327,058, filed on Apr. 22, 2010, and entitled "Multi-Compound Viscous Edge Seal for Vacuum Insulating Panels," the disclosures of which are incorporated herein by reference.

BACKGROUND

Gas permeation. Because it plays a central role in this invention the concept of gas permeation is presented here.

Without continual or periodic pumping down, the initial low pressure of any vacuum contained in a vessel will increase as atmospheric gas permeates through the materials of which the vessel is made. The rate of pressure increase will depend on the rate of permeation. Therefore the service life of a vacuum insulating glass (VIG) unit is not indefinite but can be extended, provided there is not a failure of the edge seal, by periodic pumping down through a permanently attached or temporarily attachable pump out port.

With regard to permeation Roth (1994, p 6-7) states (references cited: other publications):

Gases have the possibility to flow through solids even if the openings present are not large enough to permit a regular flow. The passage of a gas into, through and out of a barrier having no holes large enough to permit more than a small fraction of the gas to pass through any one hole is known as permeation. The steady state rate of flow in these conditions is the permeability coefficient or simply permeability. This is usually expressed in cubic centimeters of gas at STP [standard temperature and pressure] flowing per second through a square centimetre of cross section, per millimetres of wall thickness and 1 torr of pressure drop across the barrier . . . . An ideal vacuum should maintain forever the vacuum (pressure) reached at the moment of its separation from the pumps. Any real chamber presents a rise in pressure after being isolated from the pumping system. The pressure rise is produced by the gas which permeates from outside into the chamber . . . .

Also in regard to permeation O'Hanlon (2003, p 70) states (references cited: other publications):

Permeation is a three step process. Gas first absorbs on the outer wall of a vacuum vessel, diffuses through the bulk, and lastly desorbs from the interior wall. Permeation through glass, ceramic, and polymeric materials is molecular. Molecules do not dissociate on absorption. Hydrogen does dissociate on metal surfaces and diffuses as atoms that recombine before desorption on the vacuum wall.

Ceramic glasses typically used for VIG units have permeability to atmospheric gases in the range of $10^{-12}$ to $10^{-13}$ cm$^3$·mm/(cm$^2$·sec·torr).

Vacuum Insulating Glass Units. Vacuum insulating glass units are known in the art. For example, see U.S. Pat. Nos. 5,664,395; 5,657,607; 5,891,536; 5,902,652; 6,444,281 B1; 6,291,036; and 7,141,130 B2 the disclosures of which are all hereby incorporated herein by reference.

Vacuum insulating glass (VIG) units comprise two substantially parallel spaced apart glass sheets with a vacuum in between at a pressure less than atmospheric pressure. Between the glass sheets are visually nonintrusive spacers that maintain the vacuum space by resisting compressive atmospheric pressure. Common to all VIG units is an edge seal that seals the edge gap between the glass sheets and maintains the vacuum by presenting a low permeability barrier.

Thermal heat transfer via convection and conduction cannot occur through a vacuum. Consequently the energy and associated cost savings that can result from the use of VIG units in applications such as windows, doors, and skylights can be on the order of ten times greater than for inert gas filled thermal pane units, which have an inert gas such as argon or krypton at atmospheric pressure between their glass sheets.

There are serious unresolved performance and reliability problems that continue to hamper development of commercially viable VIG units, forestalling the significant energy savings that will result should they ever replace inert gas filled thermal pane. Chief among them is edge seal failure and sudden brittle fracture of the relatively non-ductile glass sheets. These failures are caused by large stresses resulting from differential thermal expansion and contraction (or "differential thermal strain") of the thermally separated glass sheets. The patent record reveals an ongoing intensive effort to solve this problem by employing more flexible edge seal designs. The effort is spurred by a quest to capitalize on market demand for more energy efficient buildings. The demand is driven by a pressing need to forestall the mounting dangers of global warming by reducing green house gas emissions.

Steven Chu, Secretary, U.S. Department of Energy, stated at the Caltech Commencement, Jun. 12, 2009:

There is a growing realization that we should be able to build buildings that will decrease energy use by 80 percent with investments that will pay for themselves in less than 15 years. Buildings consume 40 percent of the energy in the U.S., so that energy efficient buildings can decrease our carbon emissions by one third.

At the time of this writing, residential buildings account for 22 percent of U.S. energy consumption, commercial 18 percent. Of the 22 percent residential energy consumption, 42 percent is a result of residential heating and cooling. Buildings use 72 percent of the nation's electricity and 55 percent of its natural gas. Buildings are responsible for approximately 40 percent of $CO_2$ emissions in the U.S., and approximately 2,300 teragrams (Tg or million tonnes (MMT)) $CO_2$ equivalent (source U.S. Department of Energy).

The U.S. Green Building Council has instituted an internationally recognized green building certification system known as Leadership in Energy and Environmental Design or LEED certification that promotes energy savings, water efficiency. $CO_2$ emissions reduction, and improved indoor environmental quality. Leed standards promote greater use of natural light and visibility to the outdoors. VIG units make this possible without being at cross purposes with LEED energy saving and $CO_2$ emissions reduction standards. VIG units greatly reduce sound transmission, which improves the quality of living and working environments.

Because there is a vacuum between them, the glass sheets in a VIG unit are thermally isolated from one another to a far greater degree than those in inert gas units. As a result, the differential thermal strain between the glass sheets of a VIG unit caused by indoor and outdoor temperature differences in climates with large temperature extremes is far greater than for inert gas units. In a VIG unit with a rigid edge seal that joins both sheets of glass these differences in thermal strain meet at the unit's edges where they are constrained by compatibility. The result can be very large values of stress in the relatively non-ductile glass sheets and within the edge seal and its bond to the glass sheets.

The large stresses that can develop in the glass sheets of a VIG unit with a rigid edge seal can become so high that one or both ceramic glass sheets may fail suddenly in brittle fracture. This problem is exacerbated by ceramic glass's sensitivity to loss of strength from scratches and abrasions, which can precipitate breakage. If a VIG unit is a floor to ceiling window on the $94^{th}$ floor of a building and fails suddenly in brittle fracture the consequences could exceed the cost of the unit's replacement and include injury or loss of life.

Although ceramic glass has a number of negative physical properties that are disadvantages in VIG construction, the lack of materials with its unique positive physical properties makes it very difficult to circumvent ceramic glass as the preferred transparent material for VIG units. The negative physical characteristics are brittleness, low ductility, low tensile strength, and a high a modulus of elasticity. The positive characteristics are very high rigidity, resistance to creep deformation under continuous loads, hardness, and very importantly ceramic window glass such as soda-lime glass has very low gas permeability. These positive properties make ceramic glass the preferred material for VIG units, which are subject to continuous flexural loads from atmospheric pressure and which must maintain service vacuum pressures for decades.

If ceramic glass was more ductile and had greater tensile strength then many of the problems plaguing VIG development would be greatly mitigated. Given that at present there is no suitable alternative to ceramic glass, the only available avenue for progress in VIG development is improved edge seal design. A number of United States patent application Publications disclose more flexible edge seal designs, which are attempts to mitigate many of the current problems with VIG performance, assembly, reliability, and safety.

In most of the VIG units described in the art the distance between the glass sheets is necessarily very much smaller than the distance between the glass sheets of inert gas filled thermal pane units and usually less than 0.08 inch. Despite the fact that close spacing of VIG unit glass sheets exacerbates the problem of accommodating differential thermal strain between them, close spacing of VIG unit glass sheets is desirable because spacers need to be small in order to be visually nonintrusive. Small spacers conduct less thermal energy. Close spacing of VIG unit glass sheets reduces the time required to pump down the vacuum, which reduces production costs. Spacers may be or include round disks, cylinders, micro sized particles, or even nanoparticles that may or may not be imbedded within the glass sheets.

In contrast to the typical distances between the glass sheets of VIG units, the distances between the glass sheets of inert gas units is chosen to minimize heat transmission from conduction and convection. That optimal spacing is between 0.625 and 0.75 inch. Because the distances between the glass panes of inert gas thermal pane widows are much greater than for VIG units, the stresses that develop in their edge seals are less than those for VIG units given the same lateral displacement between the glass sheets and similar sealing materials. Therefore the smaller differential thermal strains that develop between the glass sheets of inert gas units as compared to VIG units can be accommodated by simple flexible elastic seals that need not resist collapse under one atmosphere of pressure and that need not maintain a one atmosphere pressure difference for decades.

The rigid ceramic solder glass or glass frit edge seals that are currently used in VIG units and that are known in the art present serious problems. Seals of this type are disclosed by U.S. Pat. Nos. 5,664,395 and 5,657,607. The advantages of ceramic solder glass edge seals are their very low gas permeability and strong bond to ceramic glass substrates. Their disadvantage is brittleness and tendency to crack or fracture in climates with large temperature extremes such as occur in North America. It takes only a very small invisible crack or breach in a VIG edge seal to drastically reduce a unit's service life and to make repair infeasible.

In the process of forming rigid ceramic solder glass edge seals the ceramic glass sheets must be heated above a temperature that will remove tempering and introduce unwanted stresses within the glass sheets. The long heating and cooling times associated with this process increase manufacturing costs. The high assembly temperatures require the spacers to be of a material that can withstand those temperatures. This limits the range of suitable spacer materials and excludes materials with lower coefficients of thermal conductivity or higher creep resistance. U.S. Pat. Nos. 6,701,749; 6,558,494; 6,541,083; 6,641,689; 6,635,321; 6,478,911; 6,365,242; and 6,336,984 disclose methods that reduce the assembly temperatures of VIG units and allow the glass sheets to retain some but not all of their tempering.

Rigid edge seals can cause bulging out of a VIG unit's glass sheets. For example, if it is colder outdoors the outer glass sheet will contract causing both the inner and outer glass sheets to bulge inward toward the interior of the building increasing the likelihood of fracture. Bulging noticeably distorts reflections creating an objectionable non aesthetic fun house environment.

Nippon Sheet Glass produces commercial VIG units with ceramic solder glass edge seals under the trade name Spacia. U.S. Pat. Nos. 5,664,395, and 5,902,652 also describe such VIG units. Service information published for these units by Nippon Sheet Glass reveal many of the problems presented above. The service information states in part (Nippon 2003) (references cited: other publications):

Precaution for Use and Maintenance
1. When wired glass type is used in different application from conventional window, please contact us before use, to avoid of the trouble due to thermal breakage.
2. Don't paste the film and paper on SPACIA. It may brings about thermal breakage. Slight dislocation and occasional omissions of pillars, even if they are found, are negligible problem in terms of product performance.
3. SPACIA is required to use in temperature condition that its difference between IN and OUT is preferably less than 35° C.
4. Don't touch on SPACIA with metallic or ceramic hard sharp. Deep scratches sometimes lead to glass breakage.
5. Some deformation of reflective image is unavoidable for process reasons and for the occasional warpage of glass in case of a big temperature difference between IN and OUT, which is based on its higher thermal insulation. [sic]

The problems associated with rigid edge seals can be reduced if a flexible seal is used. However, in comparison to stationary rigid seals, it is more difficult to achieve low permeability and leak rates for seals that accommodate or transmit motion. This difficulty exists for various reasons that include the following: flexible materials generally have higher gas permeability than rigid materials, and it is difficult to form lasting reliable bonds or tight fits between flexible elastic materials and the more rigid materials or configurations of vacuum vessels. The VIG edge seals disclosed by the United States Patent Application Publications discussed below are meant to be more flexible and ductile than rigid solder glass seals.

The problems with rigid ceramic solder glass edge seals and rigid edge seals for VIG units discussed above are enumerated by United States Patent Application Publications Nos. US 2008/01665570 A1 and US 2009/0155499 A1. These publications disclose designs that mitigate, but that do not eliminate, the above described problems by introducing metal as a bridging material between the edges of the glass sheets. Metal has greater ductility and flexibility than ceramic solder glass. This allows some movement of the edges of the ceramic glass sheets relative to one another under differential thermal strain. This results in less stress and likelihood of fracture. Some of the metal seals that are disclosed by the above publications are bent and folded into spring like forms that further increase their flexibility. These publications show some of the metal seals as being entirely between the glass sheets so that one of their dimensions is limited by the small distance between the glass sheets. This requires tight folds in the folded over metal forms and places limitations on the strains that can be accommodated without exceeding the elastic limit of the metals. Given the number of cycles of loading and unloading that would occur on a daily basis year after year because of expansion and contraction of the glass sheets, the metal seals disclosed by the above publications would very likely experience strain or work-hardening and become increasingly less ductile; possibly to a point where cracks or fissures would develop that would admit air into the vacuum at an unacceptable rate, shortening the service life of a VIG unit to years as opposed to decades. In regard to work-hardening of flexible metal joints that seal vacuums Jousten (2008, p 785) states (references cited: other publications):

> For high—and ultrahigh—vacuum equipment, flexible metal elements are used, which are welded or brazed to the flanges. Such elements include hydraulically formed bellows (the longitudinal section is wavy) and diaphragm bellows (diaphragms, welded at the outside and inside perimeters). Because they are made of metal, every component of this type is subject to work-hardening and thus wear, depending on the number of working cycles.

The folded over forms disclosed by the above publications are only effective as springs in one direction, whereas differential thermal strain in the glass sheets of a VIG unit occurs in two dimensions.

United States Patent Application Publication No. US 2009/0155499 A1 discloses that the contemplated metal edge seals may be bonded to the glass substrates by methods requiring lower temperatures than those required for solder glass seals. The methods and materials for bonding the metal strips to the glass substrates as disclosed by Pub. Nos. US 2008/01665570 A1 and US 2009/0155499 A1 are elastic in nature. Therefore the bond and bond material are subject to all the forces within the metal strips themselves. Those forces will be a function of the modulus of elasticity of the metal and the strain. Given seals made of elastic materials or having elastic bonds, any relative lateral displacement of the glass sheets will result in stresses that persist as long as the displacement persists. Under load, elastic materials are subject to failure from tensile rupture, shear rupture, stain hardening, and bond failure between joined elastic materials. Bond and material failure is a general problem with any primarily elastic material or bond used for sealing the edges of VIG units.

United States Patent Application Publication No. US 2010/0178439 A1 discloses a flexible edge seal for vacuum insulating glazing units. The preferred embodiment discloses a flexible edge seal consisting of a thin metal with convolutes. The seal is shown as being exterior to the space between the glass sheets of a VIG unit. The surface area of the seal as disclosed is very much greater than the surface area defined by the gap between the glass sheets. Two of the factors affecting rate of gas permeation are the surface area and thickness of the material through which gas permeates. The greater the surface area and the thinner the material through which gas permeates the greater will be the rate of permeation. In this regard the seal as disclosed by Pub. No. US 2010/0178439 A1 is less than optimal. The design of this seal requires a space, and therefore surface area, greater than the confines between the glass sheets will allow. The thin metal is bonded to the glass sheets and is therefore subject to both bond and elastic material failure modes.

United States Patent Application Publication No. US 2010/0034996 A1 discloses a flexible edge seal for vacuum insulating glazing units very similar to and with the same shortcomings as that disclosed by Pub. No. U.S. 2010/0178439 A1.

SUMMARY OF THE INVENTION

Unless otherwise qualified, as it relates to this invention glass herein means any material that has a glass transition temperature and includes metallic, organic, and ceramic glasses, the latter including typical window glass such as soda-lime glass. Glass herein also means any glass as described above that may include other constituents in its composition such as but not limited to nanoparticles or nanotubes, which may improve or augment the physical characteristics of the glass or response of the glass to light. Glass herein also includes glass that may have active or passive devices imbedded wholly or partially within it.

Glass sheet herein includes laminated glass, such as, for example, glass sheets bonded together by a polymer. Glass sheet herein also includes any glass object that is preponderantly flat with substantially even thickness but which may also have raised or contoured areas in regions that may function to maintain a space and separation between the otherwise flat and even thickness regions of two glass sheets. Though not detailed herein, this invention contemplates that glass sheets with raised contours may be used in some embodiments. Glass sheet herein also includes any glass object that is preponderantly flat with substantially even thickness but which may also have recessed regions whose purpose may include containing a viscous material. A glass sheet herein may have coatings applied.

Viscous material herein means any material that flows like a liquid when a force is applied and includes both linear and nonlinear viscous materials, and Bingham plastics. Not included as a viscous material herein is any glass as defined above that is at a temperature below its glass transition temperature.

Various embodiments of this invention relate to VIG units that comprise two substantially parallel spaced apart glass sheets with a vacuum space in between and that have one or more edge seals that comprise a viscous material with low gas permeability. The viscous low gas permeability material bridges at least a portion of the gap between the glass sheets and surrounding the vacuum space so as to act as at least a partial seal for the vacuum. Because the gap is bridged by a viscous material that undergoes viscous shear with very low shear stress, when the glass sheets move relative to one another the stresses in the glass sheets resulting from those viscous shear stresses are insignificant and cannot contribute to fracture of the glass sheets or noticeable bulging of the glass sheets. Relative lateral movement of the glass sheets occurs during times of changing temperature difference between indoors and outdoors. Because the bridging material is viscous, when relative lateral movement of the glass sheets ceases so to does the shear stress. This is not the case for edge seals made entirely of elastic materials where static relative displacement results in sustained stress in the glass sheets.

Barriers to constrain the viscous material and methods to place it into assembly do not require heating the glass sheets above a temperature that would affect tempering of the glass sheets. Because high temperatures are not needed for edge seal assembly, high temperature resistant spacers are not required, allowing selection of spacer composition from a broad range of materials that may have lower thermal conductivity and lower hardness that is less likely to scratch ceramic glass. A suitable polymer spacer material, which has the highest creep resistance of any polymer, is PE Polyethylene manufactured under various product names that include Polystone 7000 and Polystone 500. PE Polyethylene is self lubricating and has a very low coefficient of friction. It has lower thermal conductivity than steel or ceramic. These properties make it an ideal spacer material. It will not however withstand the assembly temperatures of current state of the art VIG units and will melt before those temperatures are reached.

Given the nature of viscous fluid flow and the no slip condition, it is not possible for the viscous material to fail as a seal because of tensile rupture, shear rupture, fracture, low temperature brittle fracture, fatigue, material breakdown, delamination, separation, splitting, bond failure, adhesive failure, or strain hardening as might occur with materials that are primarily elastic in nature. As a result, VIG units that employ a viscous edge seal as disclosed herein will fail with far less frequency and with less potential damage and risk than VIG units that employ edge seals made entirely of materials that are primarily elastic.

Some illustrative aspects and embodiments of the invention are summarized below.

One aspect of the invention provides a vacuum insulating glass unit comprising: a first glass sheet and a second glass sheet with a vacuum space in between at a pressure less than atmospheric pressure; at least one spacer in between the first and second glass sheets configured to contribute to the separation of the first and second glass sheets and the maintenance of the vacuum space; and an edge seal. The edge seal comprises: a viscous material, wherein the viscous material restricts the rate at which gas permeates into the vacuum space; the edge seal being configured to allow the first and second glass sheets to move laterally relative to one another when the first and second glass sheets experience differential thermal strain and further configured such that viscous shear occurs within at least a portion of the viscous material when there is relative lateral movement between the first and second glass sheets; and at least one barrier whose configuration constrains the viscous material. In some embodiments of this aspect of the invention, the viscous material is a Newtonian fluid, such as polyisobutene.

The barrier in the vacuum insulating glass unit may be a viscous barrier in contact with the viscous material. In some embodiments, at least one of the first and second glass sheets make up part of the barrier, while in other embodiments, the barrier does not include either of the first and the second glass sheets.

In one embodiment, the vacuum insulating glass unit includes a viscous material disposed in between the first and second glass sheets and the barrier comprises a first pair of strip spacers comprising a first strip spacer and a second strip spacer disposed between the first and second glass sheets on the vacuum space side of the viscous material, wherein the first strip spacer is affixed to the first glass sheet and the second strip spacer is affixed to the second glass sheet, and further wherein the first and second strip spacers are in contact and able to move laterally with respect to one another. The barrier further comprises a second pair of strip spacers comprising a third strip spacer and a fourth strip spacer disposed between the first and second glass sheets on the side of the viscous material opposite the vacuum space side, wherein the third strip spacer is affixed to the first glass sheet and the fourth strip spacer is affixed to the second glass sheet, and further wherein the third and fourth strip spacers are in contact and able to move laterally with respect to one another. This barrier also comprises a viscous barrier disposed in between the first pair of strip spacers and the viscous material and in between the second pair of strip spacers and the viscous material. Examples of vacuum insulating glass units in accordance with this embodiment are depicted in FIGS. 3-7, and are described in greater detail in the Detailed Description section, below.

In one variation of this embodiment of the invention, first and third strip spacers are joined by a strip of material extending in between the first and third strip spacers and in between the first glass sheet and the viscous material, and further wherein the second and fourth strip spacers are joined by a strip of material extending in between the third and fourth strip spacers and in between the second glass sheet and the viscous material.

In another embodiment, the first and second glass sheets each has an outer surface opposite the vacuum space and an inner surface facing the vacuum space and the edge seal includes an end cap having a first extension portion that extends over the outer surface of the first glass sheet and a second extension portion that extends over the outer surface of the second glass sheet, wherein the viscous material is disposed in between the outer surface of the first glass sheet and the first extension and in between the outer surface of the second glass sheet and the second extension. In this embodiment, the barrier includes a first strip spacer disposed in between the outer surface of the first glass sheet and the first extension on one side of the viscous material; a second strip spacer disposed in between the outer surface of the first glass sheet and the first extension on the other side of the viscous material; a third strip spacer disposed in between the outer surface of the second glass sheet and the second extension on one side of the viscous material; a fourth strip spacer disposed in between the outer surface of the second glass sheet and the second extension on the other side of the viscous material; and a viscous barrier disposed in between the first strip spacer and the viscous material, in between the second strip spacer and the viscous material, in between the third strip spacer and the viscous material, and in between the fourth strip spacer and the viscous material. An example of a vacuum insulating glass unit in accordance with this embodiment is depicted in FIG. 8, and is described in greater detail in the Detailed Description section, below.

In another embodiment, the edge seal includes: an end cap that forms an enclosure around the peripheral edges of the first and second glass sheets, wherein the viscous material fills the enclosure; and an elastic membrane that is affixed to and spans the gap separating the peripheral edges of the first and second glass sheets, wherein the elastic membrane is configured to constrain the viscous material. An example of a vacuum insulating glass unit in accordance with this embodiment is depicted in FIG. 9, and is described in greater detail in the Detailed Description section, below.

In another embodiment, the first and second glass sheets each has an outer surface facing opposite the vacuum space and an inner surface facing the vacuum space and the gap separating the first and second glass sheets tapers inward from the peripheral edge region of the first and second glass sheets. In this embodiment, the edge seal includes an end cap that forms an enclosure around the peripheral edges of the first and second glass sheets and the viscous material fills the enclosure and extends into the tapered gap separating the first and second glass sheets up to a point at which the surface tension at its leading edge prevents it from creeping further into the gap. An example of a vacuum insulating glass unit in accordance with this embodiment is depicted in FIG. 10, and is described in greater detail in the Detailed Description section, below.

Another aspect of the invention provides edge seals for vacuum insulating glass units. In one embodiment of this aspect of the invention, the edge seal comprises a first glass sheet and a second glass sheet with a vacuum space in between at a pressure less than atmospheric pressure. The edge seal is this embodiment comprises a viscous material, wherein the viscous material restricts the rate at which gas permeates into the vacuum; the edge seal being configured to allow the first and second glass sheets to move laterally relative to one another when the first and second glass sheets experience differential thermal strain and further configured such that viscous shear occurs within at least a portion of the viscous material when there is relative lateral movement between the first and second glass sheets; and at least one barrier whose configuration constrains the viscous material.

Another aspect of the invention provides methods for forming an edge seal for a vacuum insulating glass unit comprising a first glass sheet and a second glass sheet and at least one spacer in between the first and second glass sheets configured to contribute to the separation of the first and second glass sheets. In one embodiment, the method comprises sealing the edge of the vacuum insulating glass unit with an edge seal which, together with the first and second glass sheets, defines a vacuum space in between the first and second glass sheets; evacuating the vacuum space through a pump out port to a pressure less than atmospheric pressure; and sealing the pump out port. The edge seal in this embodiment being configured to allow relative lateral movement between the first and second glass sheets when the first and second glass sheets experience differential thermal strain and comprising: a viscous material, wherein the viscous material restricts the rate at which gas permeates into the vacuum space when it is at a pressure less than atmospheric pressure and further wherein there is viscous shear in at least a portion of the viscous material when there is relative lateral movement between the first and second glass sheets; and at least one barrier whose configuration constrains the viscous material. Sealing the edge of the vacuum insulating glass unit in this embodiment can be accomplished, for example, by pumping the viscous material in between the first and second glass sheets through one or more entry holes disposed along the periphery of at least one of the first and second glass sheets; directing, via a pressure differential, the viscous material to flow to one or more exit holes disposed along the periphery of at least one of the first and second glass sheets; and sealing the entry and exit holes. An example of a method of forming an edge seal in accordance with this embodiment is shown in FIGS. 13 and 14, and is described in greater detail in the Detailed Discussion section, below.

BRIEF DESCRIPTION OF THE DRAWINGS

The figures listed below relate to various embodiments of this invention or act as aids to reference those drawings.

FIG. 1 is a plan view of a generalized schematic depicting the basic elements of a VIG unit that is used to reference the location of the cross sectional drawings herein that do depict particular embodiments of this invention.

FIG. 3 is a cross sectional view (as referenced by FIG. 1) of the edge region of a VIG unit according to a first embodiment of this invention under the condition that the ambient air temperatures on either side of the unit are the same, as would occur if the unit was in service in a building and the indoor and outdoor temperatures were the same.

FIG. 4 is a detail of a portion of the section shown in FIG. 3 but with greatly exaggerated scale in one area for clarity.

FIG. 5 is the same cross sectional view as FIG. 3 under the condition that the ambient air temperature on one side of the unit is lower than on the other, as would occur if the unit was in service and it was colder outdoors.

DETAILED DESCRIPTION OF EXAMPLE EMBODIMENTS OF THIS INVENTION

Figure 1:
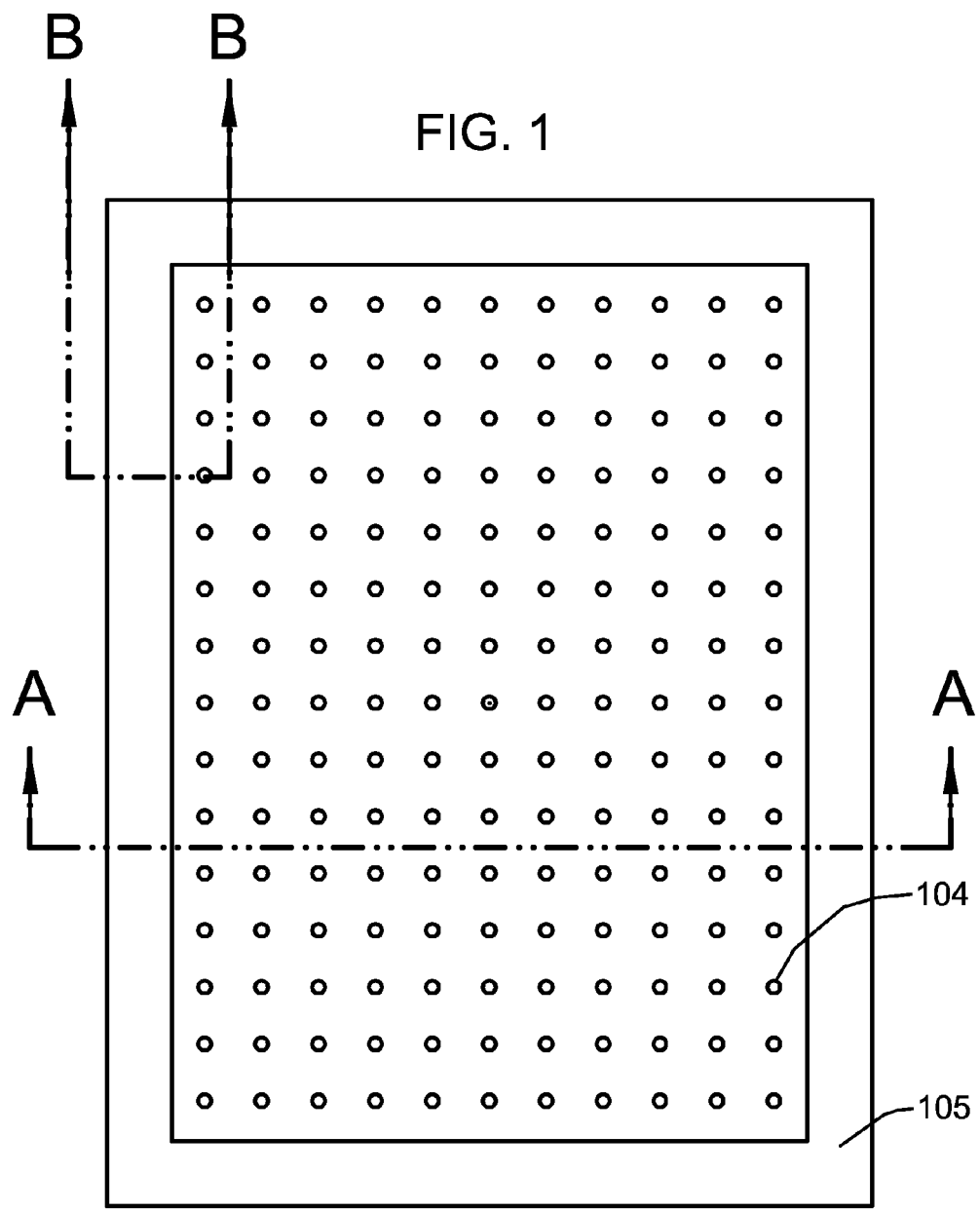
FIG. 1 is not meant to represent a particular embodiment of this invention.
Figure 2:
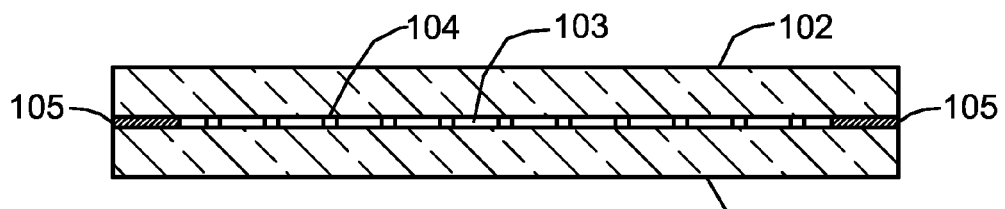
FIG. 2 is a sectional view of FIG. 3

FIG. 1 is a generalized schematic plan view depicting the basic elements of a VIG unit and is used to reference the location of the cross sectional drawings herein that depict particular embodiments of this invention. FIG. 2 is a cross section of FIG. 1. Referring to FIGS. 1 and 2, a VIG unit comprises two glass sheets 101 and 102 with a vacuum space 103 in between. The glass sheets are separated by spacers 104 which may be small discs made of PE Polyethylene. Although removal of any one spacer 104 will not necessarily result in the collapse of a portion of vacuum space 103, it can be said that every spacer 104 contributes to the separation of glass sheets 101 and 102 and therefore to the maintenance of the vacuum space 103 by resisting compression caused by atmospheric pressure. The vacuum space 103 is sealed around its perimeter by an edge seal 105.

An alternative to a multiple spacer arrangement may be a unitized or single spacer comprising a screen or mesh similar in form to insect screens but with larger grid spacing. The diameter or cross sectional dimensions of the filaments of such a screen spacer may vary so as to limit heat transmission surface area in contact with the glass sheets and so as to allow gas transmission between grid squares during pumping down of the vacuum space. A unit spacer may include perimeter strip elements with wider widths than the grid filaments. Carbon fiber may be one of many suitable materials for such a single unit screen spacer. A screen spacer may drastically reduce material and assembly costs and may be particularly well suited to take advantage of a viscous edge seal.

FIG. 3 is a cross sectional view (as referenced by FIG. 1) of the edge region of a VIG unit according to a first embodiment of this invention showing an edge seal that comprises viscous material 302 with low gas permeability and barriers that constrain viscous material 302 that include: glass sheets 303 and 304; strip spacers 305, 306, 307, 308; and lubricating low vapor pressure viscous barrier 309. Strip spacers 305, 306, 307, 308 may be made of 420 stainless steel, which has virtually the same coefficient of thermal expansion as soda lime glass, or they may be made of PE Polyethylene or other suitable polymers.

FIG. 3 shows the edge region under the condition that the ambient air temperatures on either side of the unit are the same, as would occur if the unit was in service in a building and the indoor and outdoor temperatures were the same. Glass sheets 303 and 304 are separated by an array of spacers 310. The thickness of spacers 310, and therefore the distance between glass sheets 303 and 304, may be approximately 0.02 inch. Spacers 310 may have a variety of shapes and be made of a variety of materials. The materials may be metallic, polymer, ceramic or composites of these materials. A preferred spacer 310 is a disk made of a polymer that will withstand the compressive forces placed on it, that has low thermal conductivity, and that will tend not to scratch glass sheets 303 and 304. Spacers 310 may be affixed to one of the glass sheets 303 or 304 so that they cannot migrate and yet allow relative lateral movement between glass sheets 303 and 304 with little resistance. In addition to being highly creep resistant, PE Polyethylene is self lubricating and may be a suitable material for spacers 310. The space 311 between glass sheets 303 and 304 is a vacuum at a pressure less than atmospheric pressure, preferably less than $10^{-4}$ torr. The low pressure vacuum space 311 essentially eliminates convective and conductive heat transfer through that space. Strip spacers 305 and 307 may be cemented or otherwise permanently affixed to glass sheet 303 and strip spacers 306 and 308 may be similarly affixed to glass sheet 304. Both strip spacers 305 and 306 are proximate the edges of glass sheets 303 and 304 and in between glass sheets 303 and 304. Strip spacers 305 and 306 may continue in this manner around both glass sheets 303 and 304. The thickness of strip spacers 305, 306, 307, and 308 may be the same and each equal to one half the distance between glass sheets 303 and 304. Therefore the combined thickness of spacers 305 and 306 may be equal to the distance between glass sheets 303 and 304 and the thickness of spacers 310. Strip spacers 307 and 308 are similar to strip spacers 305 and 306 except that they are situated further in from the edge of the glass sheets and there are no discontinuities as they continue around glass sheets 303 and 304. The distance between spacers 305 and 307 may be, for example, approximately two inches. For some applications where the rate of gas permeation through viscous material 302 must be kept especially low, as for example when long service life is sought without pumping down through a pump out port (not pictured) every couple of decades, the distance between strip spacers 305 and 307 may be ten inches or more. These regions of the edge where the seal is present could be buried within a wall cavity with insulation on either side. Strip spacers 305 and 307 may be one half inch wide and strip spacers 306 and 308 may be one quarter inch wide. Strip spacers 305 and 306 may contact each other in the sense that each exerts a reaction force against the other but they are not affixed to one another and are therefore free to move laterally relative to one another. Even though there may be an additional material or compound between strip spacers 305 and 306 they are still considered to be in contact. In the same sense strip spacers 307 and 308 may contact each other but are not affixed to one another and are therefore free to move laterally relative to one another. When glass sheets 303 and 304 are at the same temperature the center lines 312 of strip spacers 305 and 306 may closely coincide.

Still referring to FIG. 3, gases 313 at higher pressure than the pressure in vacuum space 311 may permeate through at least a portion of viscous material 302 at such a low rate as to provide a long service life for the vacuum insulating glass unit or at a rate that extends service life to anywhere from 10 to 20 years at which time the vacuum space 311 may be pumped down to its initial low vacuum pressure through a permanently attached or temporarily attachable pump out port (not pictured).

Still referring to FIG. 3, capping all of the edges of glass sheets 303 and 304 is an end cap 315 that may be pressed on and that surrounds the periphery of the VIG unit. In addition to shielding the edge gap 316, end cap 315 applies a clamping force against glass sheets 303 and 304 so as to maintain sufficient pressure on strip spacers 305 and 306.

Still referring to FIG. 3, viscous barrier 309 prevents viscous material 302 with low gas permeability from contacting spacers 305, 306, 307, and 308 where it could work its way between those spacers and increase frictional forces. The lubricating low vapor pressure viscous barrier 309 resists long term pressure induced creep between strip spacers 307 and 308 which are under tight contact with each other in excess of atmospheric pressure.

Let t be the thickness of a sheet of glass and let there be an arbitrary x and y Cartesian coordinate system in a plane substantially parallel to the faces of the glass sheet. In order to achieve a continuously tight gap free contact between strip spacers 307 and 308 and strip spacers 305 and 306 the gradient magnitude $|\nabla t|=|i\partial t/\partial x+j\partial t/\partial y|$ at any point around the periphery of glass sheets 303 and 304 should be sufficiently small such that any irregularities represented by $|\nabla t|$ will be pressed out through flexure caused by the compressive pressure of the atmosphere over the evacuated space 311 and by the clamping force of cap 315. Fortunately modern plate glass used for glazing is produced by the Pilkington float process. Le Bourhis (2008, p 35-36) states (references cited: other publications):

> The process was developed after the Second World War by Britain's Pilkington Brothers Ltd . . . . It was a revolution in flat glass production since polishing of the glass plates was no longer necessary . . . . In 1959, after seven years of experimentation and an investment of £7 million Pilkington Ltd introduced this economical means to produce distortion-free glass. Nowadays almost 90% of flat soda-lime-silica glass is exclusively produced in this way . . . .

The Pilkington float process automatically produces stock plate glass such that |∇t| is sufficiently small to achieve the necessary tight continuous contact between strip spacers 305 and 306, and strip spacers 307 and 308. Thickness measurements of various specimens of plate glass from various sources using a digital micrometer reading to 0.00005 inch indicate that stock unaltered float glass will meet the necessary criteria for |∇t|.

FIG. 4 is a detail of a portion of the section shown in FIG. 3 that greatly exaggerates the scale of the surface texture 317 of strip spacer 308 that is in contact with strip spacer 307. The surface texture 317 may be ground, satin, grooved, or some other category of roughness or combination of smoothness and roughness with very small amplitude 318. For example, the amplitude 318 may be on the order of 0.0004 inch. The net force on strip spacer 308 may be nine pounds per lineal inch of spacer. If the width of strip spacer 308 is one quarter inch this would result in a pressure on strip spacer 308 of 36 psi. Most of this pressure would be resisted through the high point contacts of the rough or grooved surface texture 317 of strip spacer 308 on strip spacer 307 and not by the thin film of viscous barrier 309 that will become partially interposed between strip spacers 307 and 308 due to relative lateral movement of glass sheets 303 and 304. Therefore the pressure of the thin film of viscous barrier 309 that will become partially interposed between strip spacers 307 and 308 will not exceed the pressure of viscous material 302. By limiting the pressure of the thin film of viscous barrier 309 between strip spacers 307 and 308 to that of viscous material 302 any tendency to "pump" viscous barrier 309 between spacers 307 and 308 and into vacuum space 311 is mitigated. The rough surface 317 increases the frictional forces on the thin film of viscous barrier 309 between spacers 307 and 308 and thereby increases the resistance of viscous barrier 309 to creep between spacers 307 and 308 and into evacuated space 311.

Ongoing rheological tests at three times atmospheric pressure have yet to reveal any sign of creep of a preferred material for viscous barrier 309 through a gap larger than that created by the rough surface of 317.

FIG. 5 is the same cross sectional view as FIG. 3 but under the condition that the ambient air temperature on one side of the unit is lower than on the other as would occur if the unit was in service and it was colder outdoors. When glass sheets 303 and 304 move laterally relative to one another 320 as a result of thermal strain or for any other service related reason, viscous material 302 undergoes viscous shear through a shear angle 319 with very little shear stress while maintaining adhesion to glass sheets 303 and 304 under the no-slip condition for viscous fluids. In this manner viscous material 302 cannot fail as a seal because of tensile rupture, adhesive failure, cold brittle fracture, material breakdown, strain hardening, delamination, fatigue, bond failure, shear rupture, puncture, or by inducing failure stresses in glass sheets 303 and 304. The low shear stress assures that glass sheets 303 and 304 will not bulge. Because the shear is viscous shear, where shear stress is a function of shear rate, once relative motion between glass sheets 303 and 304 stops there is no shear stress and of course no shear stress induced compressive or tensile stresses in glass sheets 303 and 304. This is not the case for elastic materials where stress persists after motion stops whether or not the strains are in the elastic or inelastic range. Therefore, given a viscous edge seal as disclosed by this embodiment, stresses in glass sheets 303 and 304 are not a function of static relative lateral displacement 320 between glass sheets 303 and 304. Therefore the size of a VIG unit with a viscous edge seal may be limited only by the practical size of producing glass sheets 303 and 304. This is not the case for the metal edge seals disclosed by Pub. Nos. US 2008/01665570 A1, US 2009/0155499 A1, US 2010/0178439 A1, and US 2010/0034996 A1, where the edge seals are subject to elastic and inelastic stress and strain and limited by strain at ultimate strength. An edge seal design that does not limit the size of a VIG unit is significant. Larger VIG units are more energy efficient because per square foot of window there can be less lineal footage of heat conducting edge seal.

Referring to FIG. 5, when lateral relative movement 320 occurs between glass sheets 303 and 304 as a result of thermal strain the space bounded by glass sheets 303 and 304 and spacers 305, 306, 307, and 308 does not change significantly and by geometric proof the volumes occupied by viscous barrier 309 do not significantly change. Therefore, given this type of relative movement, viscous barrier 309 redistributes to new shapes within the same volumes.

Figure 6:
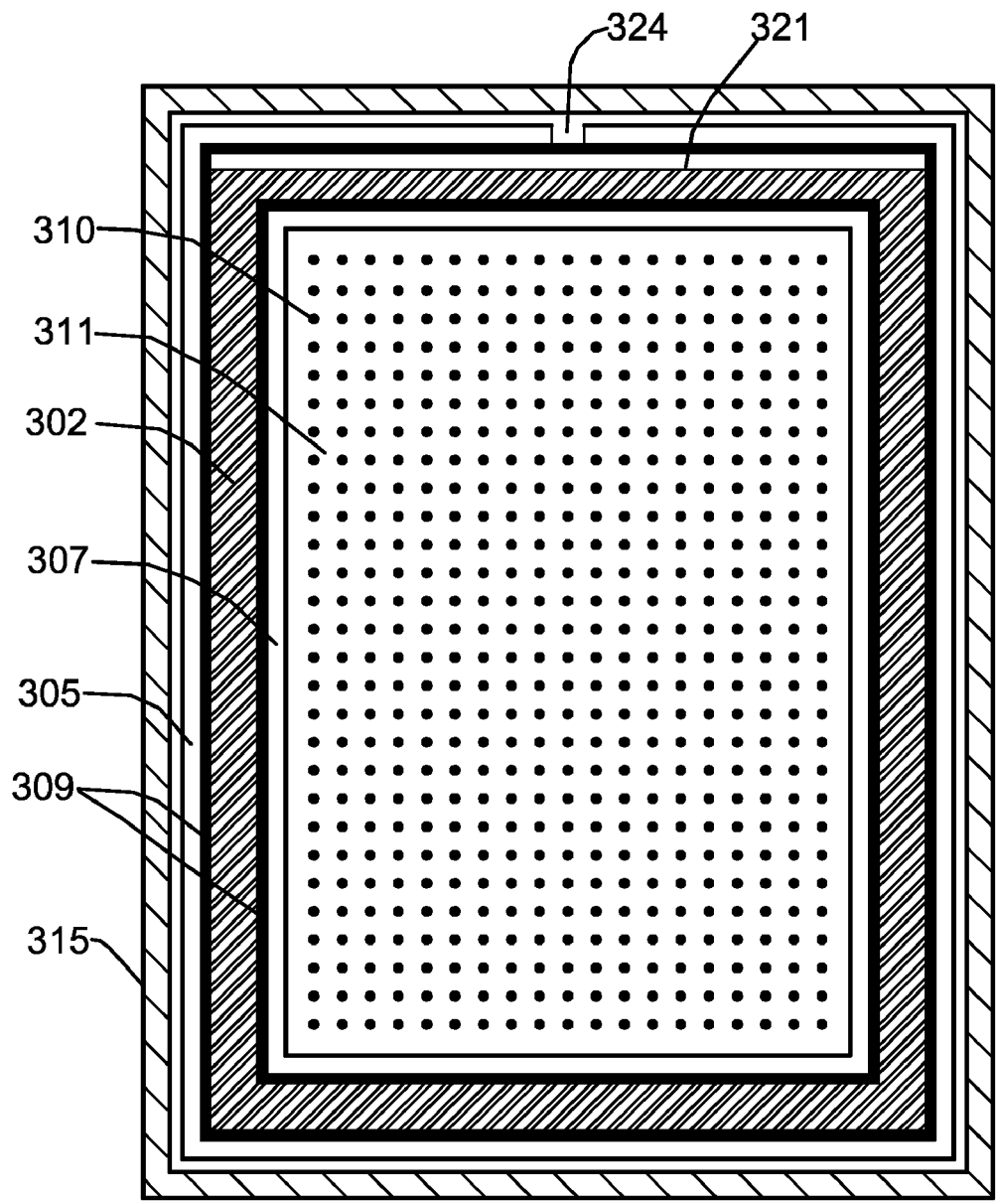
FIG. 6 is a sectional plan view of a VIG unit with an edge seal as depicted in FIG. 3.

Changing indoor and outdoor temperatures will cause the components of a VIG unit to expand and contract differentially, including viscous material 302 and viscous barrier 309. As a result, the dimensions of the spaces that contain viscous material 302 and viscous barrier 309 will change. To accommodate this, viscous material 302 has a free surface 321 across the top of the unit as depicted in FIG. 6 that rises and falls as does the free surface of any fluid whose container changes dimensions. Also shown in FIG. 6 is a break 324 in strip spacer 305 to allow pressure equalization.

By way of illustration only, in some embodiments, the viscous material used in the edge seal will have a gas permeability of no greater than about 1,000,000 (centimeter$^3$·millimeter/meter$^2$·day·bar) for oxygen gas at 20° C., as measured by ASTM D 3985. This includes embodiments in which the viscous material has a gas permeability of no greater than about 100,000 (centimeter$^3$·mm/m$^2$·d·bar) for oxygen gas at 20° C., as measured by ASTM D 3985, and further includes embodiments in which the viscous material has a gas permeability of no greater than about 10,000 (centimeter$^3$·mm/m$^2$·d·bar) for oxygen gas at 20° C., as measured by ASTM D 3985, and further includes embodiments in which the viscous material has a gas permeability of no greater than about 1,000 (centimeter$^3$·mm/m$^2$·d·bar) for oxygen gas at 20° C., as measured by ASTM D 3985.

The desirable viscosity of the low permeability viscous material may vary over a wide range depending upon a variety of factors, including the method used to apply or dispose the viscous material in the edge seal. By way of illustration only, in some embodiments, the low permeability viscous material will have a viscosity of no greater than about 90,000,000 (mPa·s) at 20° C. This includes embodiments in which the low permeability viscous material has a viscosity of no greater than about 1,000,000 (mPa·s) at 20° C., further includes embodiments in which the low permeability viscous material has a viscosity of no greater than about 10,000 (mPa·s) at 20° C., still further includes embodiments in which the low permeability viscous material has a viscosity of no greater than about 1,000 (mPa·s) at 20° C., still further includes embodiments in which the low permeability viscous material has a viscosity of no greater than about 100 (mPa·s) at 20° C. and still further includes embodiments in which the low permeability viscous material has a viscosity of no greater than about 1 (mPa·s) at 20° C.

A viscous material with low gas permeability suitable for material 302 would be a cold flowing Newtonian fluid such as a low to medium molecular weight polyisobutene or PIB. The gas permeability of polyisobutene is one of the lowest for polymers and against which the permeability of other polymers is compared. In the form of elastic butyl rubber it lines all tires to prevent permeation of air out of the tires. PIB is inert, nontoxic, and stable indefinitely. Specifically, PIB manufactured by the chemical company BASF under the trade name Oppanol B10 has suitable viscosity. Other molecular weight grades of PIB may be suitable for this invention. For example, BASF makes a family of low molecular weight PIB's under the trade name Glissopal. Under some embodiments of this invention Glissopal or some formulation combining Glissopal and an Oppanol B may be an optimal choice for the viscous material 302 with low gas permeability. The choice may depend on the particular barrier or barriers used to segregate the PIB from the evacuated space 311 and or on the particular method used to place the PIB into assembly. Oppanol B10 has atmospheric gas permeability on the order of $10^{-10}$ $cm^3 \cdot mm/(cm^2 \cdot sec \cdot torr)$. This compares favorably with the gas permeability of metals $10^{-10}$ $cm^3 \cdot mm/(cm^2 \cdot sec \cdot torr)$, and of glasses $10^{-12}$ to $10^{-13}$ $cm^3 \cdot mm/(cm^2 \cdot sec \cdot torr)$.

Given the metal and solder glass edge seal thicknesses disclosed by the prior art, a two inch wide strip of viscous material 302 consisting of PIB would have a reduced rate of permeation compared to the metal seals and an increased rate of permeation relative to the solder glass seals of only a factor of ten. Given that the edge seal accounts for only 1/1000 to 1/5000 of the permeable surface of a vacuum insulating glass unit, any loss of service life of a VIG unit with a viscous PIB edge seal, compared to a unit with a solder glass edge seal, would be negligible. If a VIG unit has a permanently attached or temporarily attachable pump out port to which a vacuum pump can be attached in order to pump down the vacuum every couple of decades then the difference between the permeation rates of a solder glass edge seal and a two inch wide viscous edge seal composed of PIB is inconsequential.

Oppanol B10 is a Newtonian fluid. A Newtonian fluid is one where shear stress is proportional to shear rate. The constant of proportionality is defined as the material's viscosity. If Oppanol B10 were used for the embodiment shown in FIG. 3 with a gap of 0.02 inches between glass sheets 303 and 304, shear stresses caused by changing temperature differentials between inside and outside while the unit is in service would result in tensile and compressive forces in glass sheets 303 and 304 on the order of fractions of a pound force per lineal inch of glass edge.

Oppanol B10 exhibits cold flow. Unless confined, any force exerted on it will cause it to flow and keep flowing. For example, if a container of Oppanol B10 is tipped over without a lid its contents will slowly spill out. Like water it seeks its own level and exerts hydrostatic pressure. If an object with greater specific gravity is placed on the surface of Oppanol B10 it will slowly sink to the bottom. If the object's specific gravity is less than Oppanol B10 it will float on the surface.

The term "viscous barrier" is used to refer to a viscous material that may be used in an edge seal along with the low permeability viscous materials described above. This term is used for clarity to distinguish the two materials in those embodiments in which they are used together in an edge seal. By way of illustration only, in some embodiments, the viscous material of the viscous barrier will have a vapor pressure of no greater than about $10^{-5}$ torr. This includes embodiments in which the viscous material of the viscous barrier has a vapor pressure of no greater than about $10^{-6}$ torr, and further includes embodiments in which the viscous material of the viscous barrier has a vapor pressure of no greater than about $10^{-8}$ torr. A suitable material for viscous barrier 309 is the high temperature vacuum grease manufactured by M & I Materials Ltd under the trade name Apiezon H. Apiezon H is relatively stiff grease with a vapor pressure at 20 degrees Celsius of $1.7 \times 10^{-9}$ torr. Apiezon H is inert and stable indefinitely. It will not melt and gets stiffer as its temperature increases. This particular characteristic is important because it will not soften if, for example, during VIG unit fabrication polyisobutene at an elevated temperature and lowered viscosity is pumped between glass sheets 303 and 304. Also of importance is the fact that the specific gravity of Apiezon H is virtually identical to that of polyisobutene.

Vacuum greases such as Apiezon H are primarily employed in vacuum sealing applications involving fixed O-ring or gasket seals or in rotary motion seals and where the vacuum space is under continual or short term intermittent pumping to maintain the vacuum at the desired level. They are also used in sealing ground glass stop cocks used in chemistry glassware. But here again the vacuums are maintained for short periods or are under continuous or short term intermittent pumping to maintain the vacuum. The importance of such greases has to do with their low vapor pressure and lubricating properties and with their ability to at least reduce gas leaking through the surface imperfections of o-rings and gaskets. Greases are generally not Newtonian fluids and under shear their shear stress is not proportional to the rate of shear but instead the relationship between shear stress and shear rate for greases takes more complicated nonlinear forms.

Use of vacuum greases in vacuum sealing applications does not suggest their use as a viscous material for edge sealing VIG units. To the contrary, the types of vacuum sealing applications where vacuum grease is employed suggest that it is not a viscous material suitable for restricting the permeation of gas through a VIG edge seal.

Figure 7:
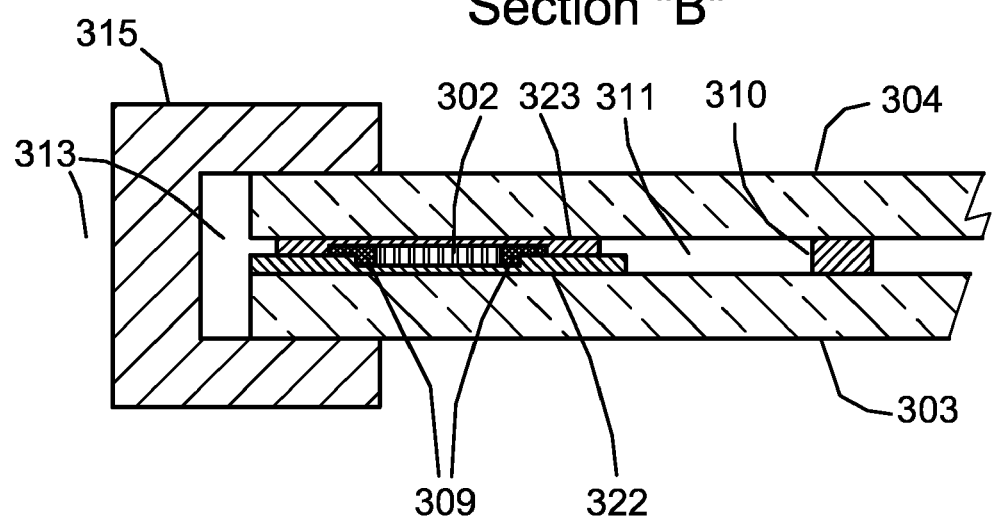
FIG. 7 is the same cross section as in FIG. 3 but with modification to more fully delineate the scope of the invention.

FIG. 7 is the same cross section as in FIG. 3 but with modification to more fully delineate the scope of the invention. The modification is that the strip spacers 305 and 307 are joined by a strip of the same material to become one strip spacer 322 and strip spacers 306 and 308 are similarly joined to become one strip spacer 323. Viscous low gas permeability material 302 is then no longer in contact with glass sheets 303 and 304. Unitizing strip spacers 305 and 307 and strip spacers 306 and 308 may speed VIG unit assembly times and reduce the area presented by viscous low gas permeability material 302 for gas to permeate through.

Figure 8:
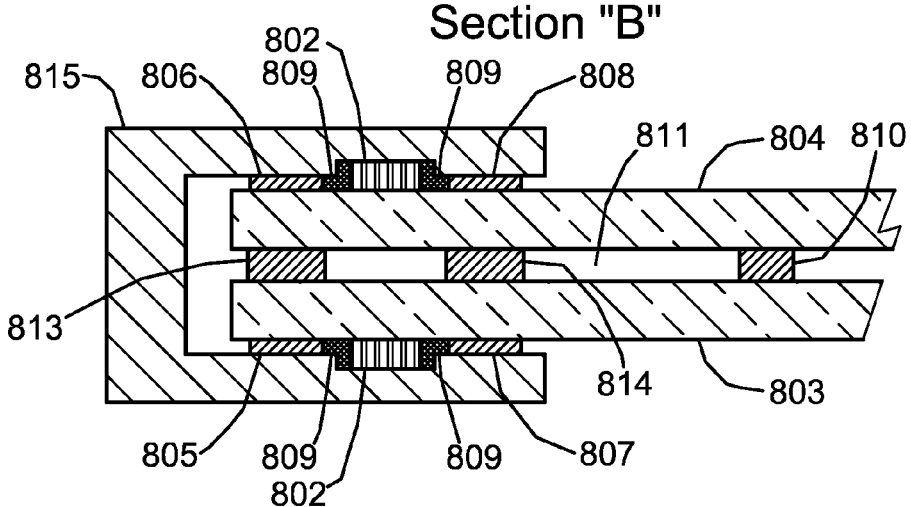
FIG. 8 is a cross sectional view (as referenced by FIG. 1) of the edge region of a VIG unit according to a second embodiment of this invention under the condition that the ambient air temperatures on either side of the unit are the same, as would occur if the unit was in service in a building and the indoor and outdoor temperatures were the same.

FIG. 8 is a cross sectional view (as referenced by FIG. 1) of the edge region of a VIG unit according to a second embodiment of this invention showing an edge seal that comprises viscous material 802 with low gas permeability and barriers to constrain viscous material 802 that include: glass sheets 803 and 804; strip spacers 805, 806, 807, and 808; lubricating low vapor pressure viscous barrier 809; and end cap 815. FIG. 8 shows the edge region under the condition that the ambient air temperatures on either side of the unit are the same, as would occur if the unit was in service in a building and the indoor and outdoor temperatures were the same. Viscous material 802 with low gas permeability and viscous barrier 809 may continue unbroken around the edge regions of glass sheets 803 and 804. Strip spacers 805, 806, 807, 808, and end cap 815 may continue unbroken around the edge regions of glass sheets 803 and 804. End cap 815 may place a clamping or compressive force against glass sheets 803 and 804. Glass sheets 803 and 804 are separated by an array of spacers 810 and by strip spacers 813 and 814. Strip spacers 813 and 814 may continue unbroken around the edge regions of glass sheets 803 and 804. The space 811 between glass sheets 803 and 804 is a vacuum at a pressure less than atmospheric, preferably less than $10^{-4}$ torr. The low pressure vacuum space 811 greatly reduces convective and conductive heat transfer between glass sheets 803 and 804. Strip spacers 805 and 807 may be cemented to glass sheet 803 and strip spacers 806 and 808 may be cemented to glass sheet 804. End cap 815 is free to move relative to spacers 805, 806, 807, and 708. When there is relative lateral movement between glass sheets 803 and 804 some portion of viscous material 802 will undergo viscous shear.

Figure 9:
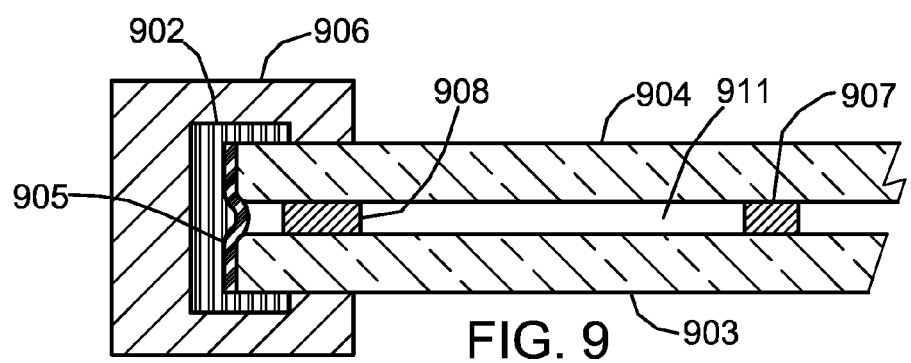
FIG. 9 is a cross sectional view (as referenced by FIG. 1) of the edge region of a VIG unit according to a third embodiment of this invention under the condition that the ambient air temperatures on either side of the unit are the same, as would occur if the unit was in service in a building and the indoor and outdoor temperatures were the same.

FIG. 9 is a cross sectional view (as referenced by FIG. 1) of the edge region of a VIG unit according to a third embodiment of this invention showing an edge seal that comprises viscous material 902 with low gas permeability and barriers to constrain viscous material 902 that include: glass sheets 903 and 904, elastic membrane 905, and end cap 906. Elastic membrane 905 is cemented or otherwise affixed to glass sheets 903 and 904. Elastic membrane 905 need not have low gas permeability so it can be made of a material and with a thickness that stretches easily and with very little force. FIG. 9 shows the edge region under the condition that the ambient air temperatures on either side of the unit are the same as would occur if the unit was in service in a building and the indoor and outdoor temperatures were the same. Glass sheets 903 and 904 are separated by an array of spacers 907 and by strip spacer 908. Viscous material 902, elastic membrane 905, end cap 906 and strip spacer 908 may continue unbroken around the edge regions of glass sheets 903 and 904. The space 911 between glass sheets 903 and 904 is a vacuum at a pressure less than atmospheric, preferably less than $10^{-4}$ torr. The low pressure vacuum space 911 greatly reduces convective and conductive heat transfer between glass sheets 903 and 904. End cap 906 may place a clamping or compressive force against glass sheets 903 and 904. End cap 906 is not affixed to glass sheets 903 and 904 and is free to move relative to glass sheets 903 and 904. When there is relative lateral movement between glass sheets 903 and 904 some portion of viscous material 902 will undergo viscous shear.

Figure 10:
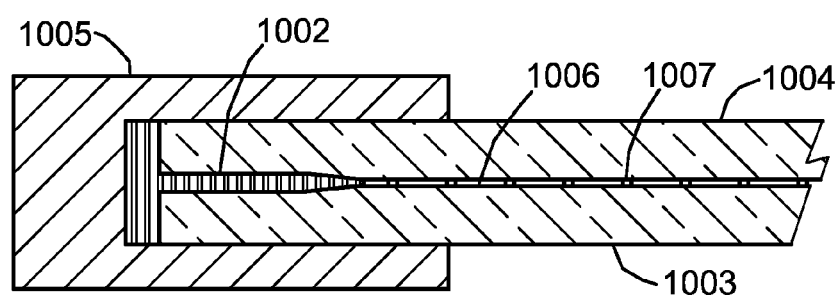
FIG. 10 is a cross sectional view (as referenced by FIG. 1) of the edge region of a VIG unit according to a fourth embodiment of this invention under the condition that the ambient air temperatures on either side of the unit are the same, as would occur if the unit was in service in a building and the indoor and outdoor temperatures were the same.

FIG. 10 is a cross sectional view (as referenced by FIG. 1) of the edge region of a VIG unit according to a fourth embodiment of this invention showing an edge seal that comprises viscous material 1002 with low gas permeability and barriers to constrain viscous material 1002 that include: glass sheets 1003, 1004, and end cap 1005. Viscous material with low gas permeability 1002 and end cap 1005 may continue unbroken around the edge regions of glass sheets 1003 and 1004. The space 1006 between glass sheets 1003 and 1004 is a vacuum at a pressure less than atmospheric pressure, preferably less than $10^{-4}$ torr. The low pressure vacuum space 1006 greatly reduces convective and conductive heat transfer between glass sheets 1003 and 1004. Maintaining separation between glass sheets 1003 and 1004 are micro sized spacers 1007 that may be made of, for example, nanoparticles or nanotubes. Viscous material 1002 is prevented from creeping into space 1006 by surface tension at the leading edge of material 1002 that is bounded by vacuum space 1006. This is made possible by the extremely close spacing of glass sheets 1003 and 1004. When there is relative lateral movement between glass sheets 1003 and 1004 some portion of viscous material 1002 will undergo viscous shear.

Figure 11:
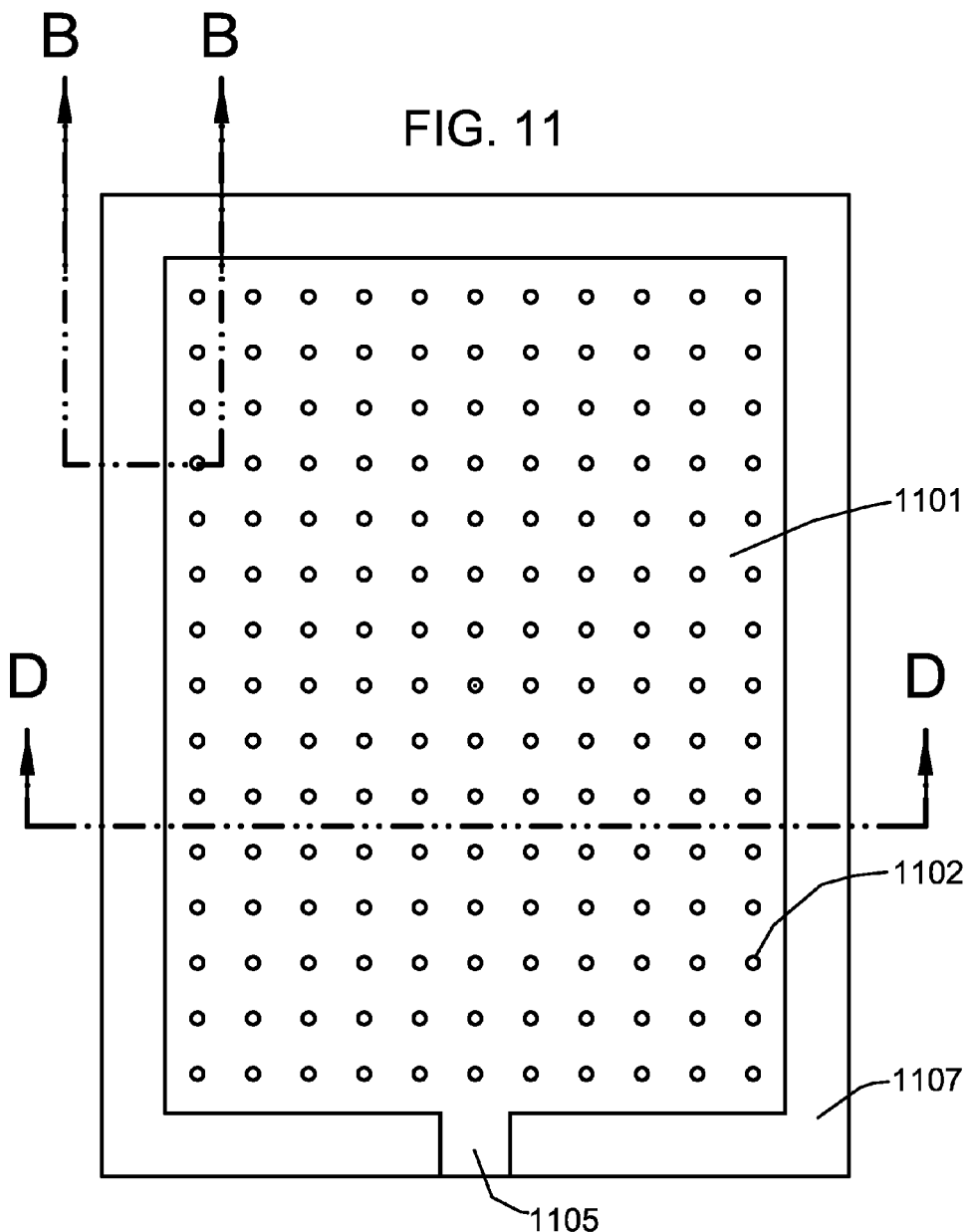
FIG. 11 shows a schematic plan view of a VIG unit indicating that the edge seals disclosed herein need not run continuously around the edges of a VIG unit and that they may be discontinuous.
Figure 12:
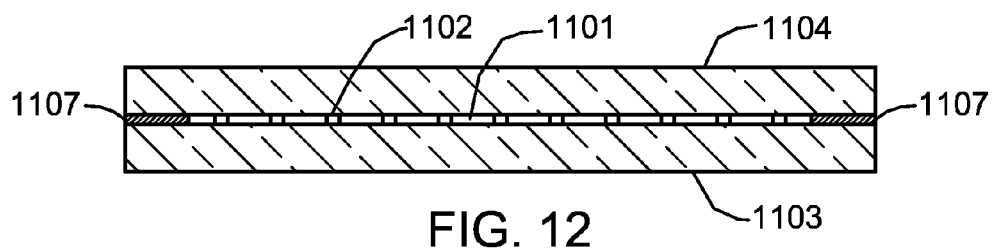
FIG. 12 is a sectional view of FIG. 11.

FIG. 11 shows a schematic plan view of a VIG unit with a vacuum 1101 and an array of spacers 1102 between glass sheets 1103 and 1104 as depicted in FIG. 12, which is a sectional view of FIG. 11. Glass sheets 1103 and 1104 are rigidly joined to one another at 1105. Edge seal 1107 may be any of the first through fourth embodiments disclosed herein. Glass sheets 1103 and 1104 are free to expand and contract independently of one another yet remain fixed at point 1105. The rigid contact point 1105 prevents glass sheets 1103 and 1104 from "walking" their way out of registration with one another as a result of repeated cycles of expansion and contraction of glass sheets 1103 and 1104. The embodiment of a VIG unit as disclosed by FIG. 11 underscores that the viscous edge seals as disclosed herein need not be continuous and without break.

Figures 13, 14:
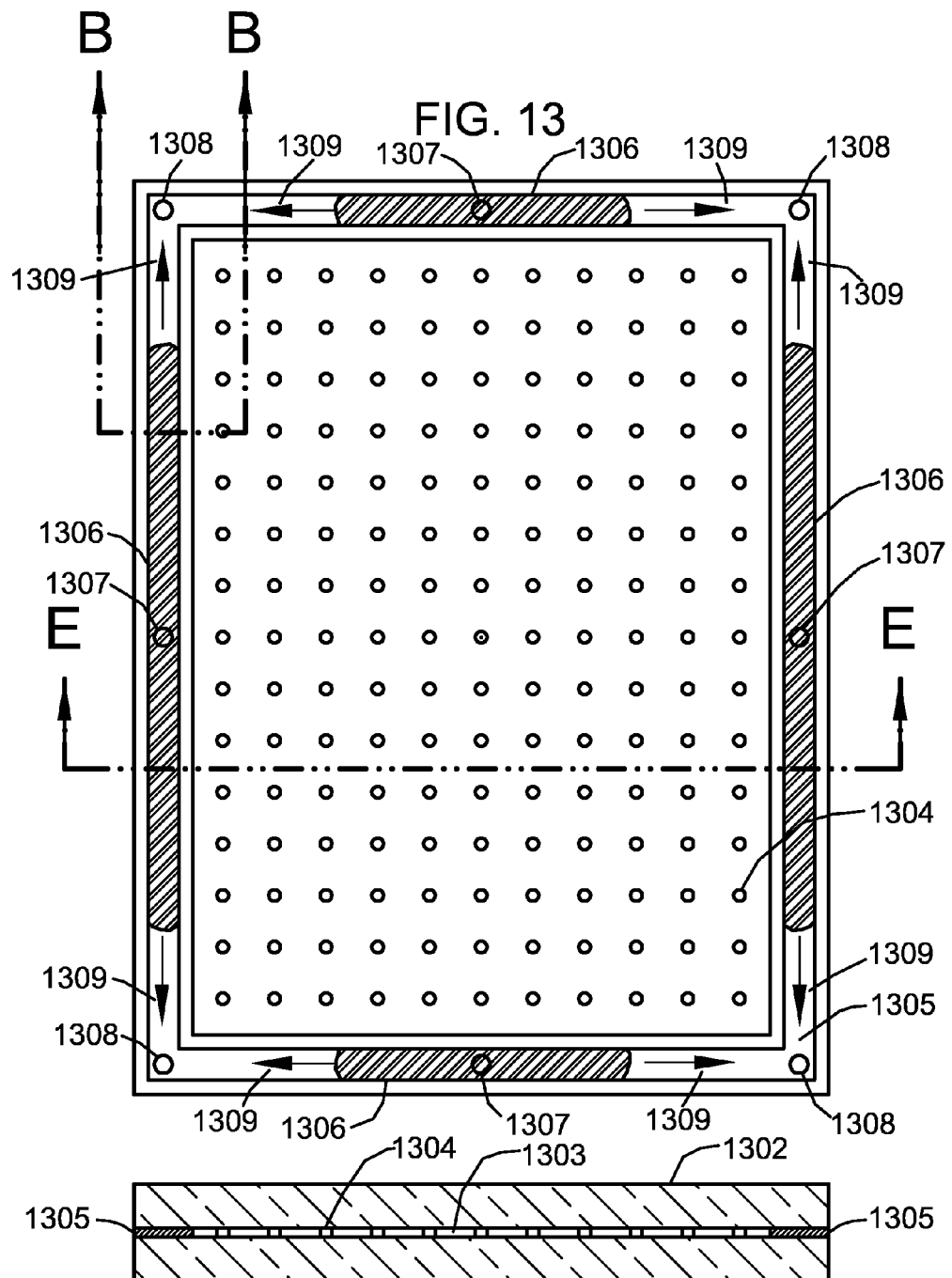
FIG. 13 is a schematic plan view of a VIG unit that diagrams a method of assembly for the edge seal depicted in FIG. 3 through FIG. 6.
FIG. 14 is a sectional view of FIG. 13.

FIG. 13 is a schematic plan view of a VIG unit that diagrams a process suitable for the first embodiment, herein depicted in FIG. 3 through FIG. 6, for placing a viscous low gas permeability material 1306 into assembly between glass sheets 1301 and 1302. FIG. 14 is a section of FIG. 13. Glass sheets 1301 and 1302 have a vacuum 1303 in between them and are separated by an array of spacers 1304. The assembly process is as follows: first, glass sheets 1301 and 1302 are placed together so as to sandwich all of the spacers between them; second, edge caps, 315 in FIG. 3, are pressed onto the edges; third, viscous low gas permeability material 1306 is pumped through holes 1307 in glass sheet 1302 while maintaining lower pressures at holes 1308; fourth, viscous material 1306 flows 1309 toward holes 1308; fifth, after the viscous material has been placed, holes 1307 and 1308 are sealed with caps.

Any method to seal a VIG unit that comprises two glass sheets with a vacuum space in between must include one or more low gas permeability materials that bridge or span the gaps between the glass sheets so as to seal off and maintain the vacuum. The most advantageous places to bridge those gaps are in the edge regions of the glass sheets. Examples in the art show that combinations of different materials may be used to bridge the gaps. Those materials may be configured in literally an infinite number of ways. As examples, the materials may be entirely between the glass sheets, or entirely outside the space between the glass sheets, or they may be partially between the glass sheets.

The commonality among the infinite number of possible embodiments for this invention is that a viscous material bridges or spans some portion of the gap between the glass sheets of a VIG unit and that relative lateral movement between the glass sheets is accommodated by the viscous material undergoing viscous shear. It is contemplated that the scope of this invention encompasses all of the infinite number of ways that a viscous material might be configured and constrained so as to function in the above described manner.

REFERENCES CITED

Other Publications

Jousten K, editor. Handbook of Vacuum Technology. Weinheim, Germany: Wiley-VCH; 2008. 1002 p.
Le Bourhis E. 2008. Glass, Mechanics and Technology. Weinheim, Germany: Wiley-VCH. 366 p.
Macosko C. W. 1994. Rheology, Principles, Measurements, and Applications. New York: Wiley-VCH. 550 p.
Morrison F. A. 2001. Understanding Rheology. New York: Oxford University Press. 545 p. Nippon Sheet Glass. 2003. Precaution For Use and Maintainance [sic]. 1 screen. Available from: http://www.nsg-spacia.co.jp/tecb/warranty.html
O'Hanlon J. F. 2003. A User's Guide to Vacuum Technology, $3^{rd}$ Ed. Hoboken, N.J.: John Wiley & Sons. 516 p.
Roth A. 1994. Vacuum Sealing Techniques. Woodbury, N.Y.: American Institute of Physics. 845 p.

What is claimed is:
1. A vacuum insulating glass unit comprising:
(a) a first glass sheet and a second glass sheet with a vacuum space in between at a pressure less than atmospheric pressure;

(b) at least one spacer in between the first and second glass sheets configured to contribute to the separation of the first and second glass sheets and the maintenance of the vacuum space; and (c) an edge seal comprising:
  (i) a viscous material, wherein the viscous material restricts the rate at which gas permeates into the vacuum space; the edge seal being configured to allow the first and second glass sheets to move laterally relative to one another when the first and second glass sheets experience differential thermal strain and further configured such that viscous shear occurs within at least a portion of the viscous material when there is relative lateral movement between the first and second glass sheets; and
  (ii) at least one barrier whose configuration constrains the viscous material.

2. A vacuum insulating glass unit according to claim 1, wherein the viscous material has a gas permeability of no greater than 1,000,000 $cm^3 \cdot mm/(m^2 \cdot bar \cdot day)$ for oxygen gas at 20° C., as measured by ASTM D 3985.

3. A vacuum insulating glass unit according to claim 1, wherein the viscous material is a Newtonian fluid.

4. A vacuum insulating glass unit according to claim 1, wherein the viscous material includes polyisobutene.

5. A vacuum insulating glass unit according to claim 1, wherein the viscous material consists essentially of polyisobutene.

6. A vacuum insulating glass unit according to claim 1, wherein the barrier is a viscous barrier in contact with the viscous material.

7. A vacuum insulating glass unit according to claim 1, wherein the barrier comprises at least one of the first and the second glass sheets.

8. A vacuum insulating glass unit according to claim 1, wherein the barrier does not include either of the first and the second glass sheets.

9. A vacuum insulating glass unit according to claim 1, wherein viscous material is disposed in between the first and second glass sheets and the at least one barrier comprises a pair of strip spacers comprising a first strip spacer and a second strip spacer disposed between the first and second glass sheets, wherein the first strip spacer is affixed to the first glass sheet and the second strip spacer is affixed to the second glass sheet, and further wherein the first and second strip spacers are in contact and able to move laterally with respect to one another.

10. A vacuum insulating glass unit according to claim 1, wherein the edge seal further includes:
  an end cap that forms an enclosure around the peripheral edges of the first and second glass sheets, wherein the viscous material fills the enclosure;
  and an elastic membrane that is affixed to and spans the gap separating the peripheral edges of the first and second glass sheets, wherein the elastic membrane is configured to constrain the viscous material.

11. The vacuum insulating glass unit according to claim 9, further comprising a viscous barrier disposed in between the vacuum space and the viscous material.

12. The vacuum insulating glass unit according to claim 11, wherein at least a portion of the first strip spacer and at least a portion of the second strip spacer are disposed between the vacuum space and the viscous barrier.

13. The vacuum insulating glass unit according to claim 1, wherein the viscous material is disposed in between the first and second glass sheets.

* * * * *

UNITED STATES PATENT AND TRADEMARK OFFICE
CERTIFICATE OF CORRECTION

PATENT NO.        : 8,182,887 B2
APPLICATION NO.   : 13/046858
DATED             : May 22, 2012
INVENTOR(S)       : Robert S. Jones It is certified that error appears in the above-identified patent and that said Letters Patent is hereby corrected as shown below:

IN THE DRAWINGS

Sheet 2, FIG. 5

The line extending from reference numeral 308 should extend to the strip spacer that is depicted by the upper small cross-hatched rectangle (immediately to the left of space 311), as shown below.

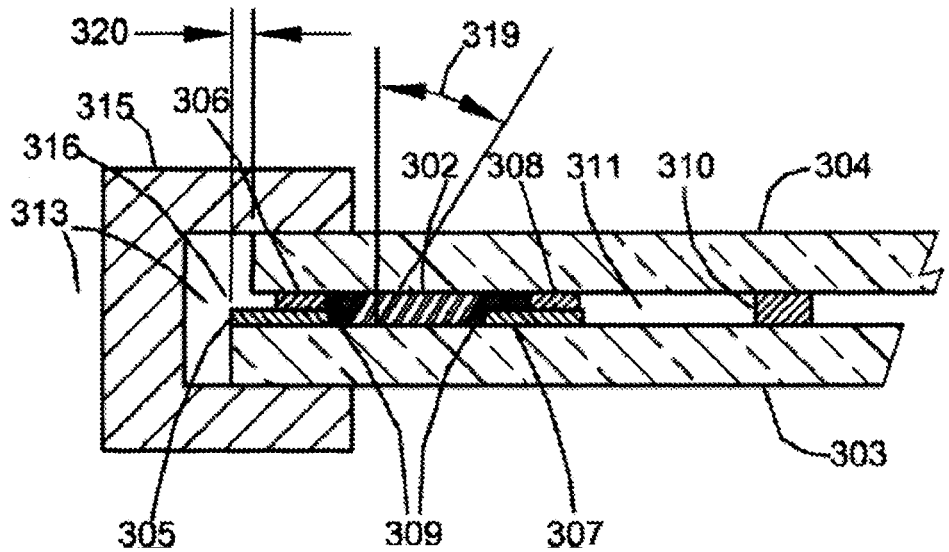

IN THE SPECIFICATION

Col. 2, Line 52

Delete ". $CO_2$ emissions reduction" and replace with --, $CO_2$ emissions reduction--

Signed and Sealed this
Sixth Day of May, 2014

Michelle K. Lee
*Deputy Director of the United States Patent and Trademark Office*

IN THE SPECIFICATION

Col. 5, Line 7

Delete "2008/01665570" and replace with --2008/0166570--

Col. 5, Line 52

Delete "2008/01665570" and replace with --2008/0166570--

Col. 7, Line 5

Delete "so to does" and replace with --so too does--

Col. 9, Line 21

Delete "seal is this" and replace with --seal in this--

Col. 10, Line 7

Delete "view of FIG. 3" and replace with --view of FIG. 1--

Col. 14, Line 1

Delete "2008/01665570" and replace with --2008/0166570--